(12) United States Patent
Strock

(10) Patent No.: US 11,492,974 B2
(45) Date of Patent: Nov. 8, 2022

(54) THERMAL BARRIER COATING WITH REDUCED EDGE CRACK INITIATION STRESS AND HIGH INSULATING FACTOR

(71) Applicant: Raytheon Technologies Corporation, Farmington, CT (US)

(72) Inventor: Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 130 days.

(21) Appl. No.: 16/870,449

(22) Filed: May 8, 2020

(65) Prior Publication Data
US 2021/0348562 A1    Nov. 11, 2021

(51) Int. Cl.
F02C 7/24 (2006.01)
F01D 5/28 (2006.01)
F01D 11/12 (2006.01)

(52) U.S. Cl.
CPC ............... *F02C 7/24* (2013.01); *F01D 5/288* (2013.01); *F01D 11/12* (2013.01); *F05D 2220/32* (2013.01); *F05D 2250/231* (2013.01); *F05D 2300/15* (2013.01); *F05D 2300/182* (2013.01); *F05D 2300/5023* (2013.01); *F05D 2300/514* (2013.01); *F05D 2300/611* (2013.01)

(58) Field of Classification Search
CPC . F01D 5/288; F05D 2300/611; F05D 2230/90
See application file for complete search history.

(56) References Cited

U.S. PATENT DOCUMENTS

| 4,289,447 | A | * | 9/1981 | Sterman | F01D 11/125 264/642 |
| 4,594,053 | A | * | 6/1986 | Sohngen | F01D 11/125 415/200 |
| 4,639,388 | A | * | 1/1987 | Ainsworth | F27D 1/063 428/117 |
| 6,306,515 | B1 | * | 10/2001 | Goedjen | C23C 28/325 416/241 B |

(Continued)

FOREIGN PATENT DOCUMENTS

| DE | 10357180 A1 * | 6/2005 | ............ C23C 4/02 |
| EP | 1645652 A1 * | 4/2006 | ............ B23K 26/32 |

(Continued)

OTHER PUBLICATIONS

EP Search Report dated Oct. 6, 2021 issued for corresponding European Patent Application No. 21173011.4.

(Continued)

*Primary Examiner* — Topaz L. Elliott
(74) *Attorney, Agent, or Firm* — Bachman & LaPointe, P.C.

(57) ABSTRACT

A thermal barrier coating disposed on a substrate comprising a plurality of surface features formed on the substrate proximate an inner side of the substrate, each of the plurality of surface features comprising a metallic column having a top with rounded edges; a dense layer disposed in a valley located between each of the plurality of surface features, and the dense layer disposed on the top and covering the rounded edges; a thermally insulating topcoat disposed over the plurality of surface features.

17 Claims, 3 Drawing Sheets

(56) References Cited

U.S. PATENT DOCUMENTS

| | | | |
|---|---|---|---|
| 6,846,574 B2 | 1/2005 | Subramanian | |
| 8,506,243 B2 | 8/2013 | Strock et al. | |
| 9,194,243 B2 * | 11/2015 | Bolcavage | C23C 4/02 |
| 10,196,920 B2 | 2/2019 | Subramanian | |
| 10,711,794 B2 * | 7/2020 | Propheter-Hinckley | F01D 5/28 |
| 2002/0146541 A1 * | 10/2002 | Fried | B22C 7/02 |
| | | | 428/172 |
| 2009/0075023 A1 | 3/2009 | Cosack et al. | |
| 2009/0324401 A1 * | 12/2009 | Calla | C23C 28/3215 |
| | | | 415/200 |
| 2011/0014060 A1 * | 1/2011 | Bolcavage | F01D 5/20 |
| | | | 416/241 R |
| 2011/0116920 A1 * | 5/2011 | Strock | F01D 11/08 |
| | | | 428/600 |
| 2011/0300342 A1 * | 12/2011 | Lutjen | C23C 28/3215 |
| | | | 428/173 |
| 2016/0251970 A1 | 9/2016 | Strock et al. | |
| 2016/0369637 A1 * | 12/2016 | Subramanian | F01D 9/023 |
| 2017/0175560 A1 | 6/2017 | Merrill et al. | |
| 2018/0135435 A1 * | 5/2018 | Propheter-Hinckley | F01D 5/288 |
| 2018/0290929 A1 * | 10/2018 | Clark | C23C 4/073 |
| 2020/0325783 A1 * | 10/2020 | Strock | C23C 4/11 |

FOREIGN PATENT DOCUMENTS

| | | | |
|---|---|---|---|
| EP | 1461472 B1 | 12/2016 | |
| GB | 2272453 A * | 5/1994 | F01D 5/288 |

OTHER PUBLICATIONS

Vaishak Viswanathan, et al.; "Engineered Multilayer Thermal Barrier Coatings for Enhanced Durability and Functional Performance" Journal of American Ceramic Society, 2014, pp. 1-9, DOI:10.1111/jace.13033.

W. A. Nelson, et al.; NASA-CR-168036; "Energy Efficient Engine-High Pressure Turbine Ceramic Shroud Support Technology Report", Nov. 1982.

\* cited by examiner

THERMAL BARRIER COATING WITH REDUCED EDGE CRACK INITIATION STRESS AND HIGH INSULATING FACTOR

BACKGROUND

The present disclosure is directed to a method for designing the surface feature associated with geometrically segmented abradable ceramic (GSAC) thermal barrier coating (TBC).

Components that are exposed to high temperatures, such as a component within a gas turbine engine, typically include protective coatings. For example, components such as turbine blades, turbine vanes, blade outer air seals, combustor and compressor components typically include one or more coating layers that function to protect the component from erosion, oxidation, corrosion or the like to thereby enhance component durability and maintain efficient operation of the engine.

As an example, some conventional turbine blade outer air seals include an abradable ceramic coating that contacts tips of the turbine blades such that the blades abrade the coating upon operation of the engine. The abrasion between the outer air seal and the blade tips provide a minimum clearance between these components such that gas flow around the tips of the blades is reduced to thereby maintain engine efficiency. Over time, internal stresses can develop in the protective coating to make the coating vulnerable to cracking and spalling. Thermo-mechanical fatigue (TMF) is the overlay of a cyclical mechanical loading that leads to fatigue of a material, with a cyclical thermal loading. Thermo-mechanical fatigue is a factor that needs to be considered in the design of the coating system.

Increasing emphasis on environmental issues and fuel economy continue to drive turbine temperatures up. The higher engine operating temperatures results in an ever increasing severity of the operating environment inside a gas turbine. The severe operating environment results in more coating and base metal distress and increased maintenance costs. For example, more frequent replacement of the outer air seals.

A coating exists called a geometrically segmented abradable ceramic, (GSAC). The GSAC in development has the potential to satisfy the above described needs in many applications, however the most severe service environments still cause the ceramic surface layer of GSAC to spall. There exists a need for a further durability improvement to GSAC coating.

SUMMARY

In accordance with the present disclosure, there is provided a thermal barrier coating disposed on a substrate comprising a plurality of surface features formed on the substrate proximate an inner side of the substrate, each of the plurality of surface features comprising a metallic column having a top with rounded edges; a dense layer disposed in a valley located between each of the plurality of surface features, and the dense layer disposed on the top and covering the rounded edges; a thermally insulating topcoat disposed over the dense layer and/or the plurality of surface features.

A further embodiment of any of the foregoing embodiments may additionally and/or alternatively include the dense layer comprises a 5-10 mil thick YSZ coating.

A further embodiment of any of the foregoing embodiments may additionally and/or alternatively include the metallic column top of each of the plurality of surface features comprises a radius from 1 to 5 times a thickness of the dense layer thickness.

A further embodiment of any of the foregoing embodiments may additionally and/or alternatively include the thermal barrier coating further comprising a bond coat disposed between the dense layer and the substrate.

A further embodiment of any of the foregoing embodiments may additionally and/or alternatively include the bond coat comprises a thickness of from 1-15 mills of MCrAlY.

A further embodiment of any of the foregoing embodiments may additionally and/or alternatively include the thermally insulating topcoat comprises at least one of a porous material disposed over the dense layer between the plurality of surface features and/or the porous material disposed over the dense layer at the top of the metallic column.

A further embodiment of any of the foregoing embodiments may additionally and/or alternatively include the thermally insulating topcoat covers greater than 50 percent of a total area of the thermal barrier coating.

In accordance with the present disclosure, there is provided a turbine engine component comprising a compressor section; combustor fluidly connected with the compressor section; and a turbine section downstream from the combustor, the turbine section having a seal that includes a substrate extending between two circumferential sides, a leading edge, a trailing edge, an inner side for resisting hot engine exhaust gases from the combustor, and an outer side, a plurality of surface features formed in the substrate protruding from the substrate away from the outer side, the plurality of surface features comprising a metallic column structure having a rounded edge proximate a top of the column, a dense layer disposed in a valley between the plurality of surface features and disposed on the top of the column, a thermally insulating topcoat disposed over the plurality of surface features and disposed over the dense layer.

A further embodiment of any of the foregoing embodiments may additionally and/or alternatively include the surface features are configured as a pattern of rounded columns that define a cell structure therebetween; wherein the pattern provides the metallic column structure a spacing that results in the surface features making up less than or equal to fifty percent of a coating area.

A further embodiment of any of the foregoing embodiments may additionally and/or alternatively include surface features comprise rounded edges at both the top and a bottom of the metallic column structure configured to reduce stress in the dense layer at both the top and a bottom of the metallic column structure of said plurality of surface features.

A further embodiment of any of the foregoing embodiments may additionally and/or alternatively include the component further comprises a bond coat disposed between the dense layer and the substrate.

A further embodiment of any of the foregoing embodiments may additionally and/or alternatively include the thermally insulating topcoat comprises a porous material disposed over the dense layer between the plurality of surface features and disposed over the dense layer at the top of the metallic column structure.

A further embodiment of any of the foregoing embodiments may additionally and/or alternatively include the plurality of surface features can have an aspect ratio of 0.5-2.5 height to width.

In accordance with the present disclosure, there is provided a method of interrupting spallation for geometrically segmented coatings on a gas turbine engine component comprising the gas turbine engine component having a surface; forming a plurality of surface features protruding from the surface, the plurality of surface features comprising a metallic column structure having a rounded edge proximate a top of the column; disposing a dense layer on the surface in a valley between the plurality of surface features and disposing the dense layer on the rounded edge and the top of the column; and disposing a thermally insulating topcoat over the surface feature and the dense layer.

A further embodiment of any of the foregoing embodiments may additionally and/or alternatively include the process further comprising disposing a bond coat layer between the surface and the dense layer.

A further embodiment of any of the foregoing embodiments may additionally and/or alternatively include the process further comprising configuring the plurality of surface features as a pattern of rounded columns that define a cell structure therebetween; wherein the pattern provides the metallic column structure a spacing that results in the surface features making up less than or equal to fifty percent of a coating area.

A further embodiment of any of the foregoing embodiments may additionally and/or alternatively include the plurality of surface features can have an aspect ratio of 0.5-2.5 height to width.

A further embodiment of any of the foregoing embodiments may additionally and/or alternatively include the process further comprising reducing stress in the dense ceramic layer at both the top and a bottom of the metallic column structure of said plurality of surface features.

A further embodiment of any of the foregoing embodiments may additionally and/or alternatively include the thermally insulating topcoat comprises a porous material disposed over the dense layer between the plurality of surface features and disposed over the dense layer at the top of the metallic column.

A further embodiment of any of the foregoing embodiments may additionally and/or alternatively include the metallic column top of each of the plurality of surface features comprises a radius from 1 to 5 times a thickness of the thermally insulating topcoat thickness.

The present disclosure uses the inverse of the divot structure of GSAC coating and modifies it by introducing radii for reducing stress concentration at the free edges of a high toughness, dense TBC. Here, stresses are relieved by expansion joints in all three primary constituents; the metal columns, the dense TBC and the porous TBC filling between the columns. This is done by interrupting the transmission of stress with a gap (between columns) or a segmentation crack that is forced to form at regular and close spacing by the close approach of adjacent columns. Stress is further reduced at the dense TBC edges by causing a natural taper to form over a rounded (radius) edge.

The most desirable coating configuration is a column structure produced by additive manufacturing of MCrAlY composition on a superalloy substrate, 8-12 mils of MCrAlY bond coat, 5-10 mil dense YSZ APS coating followed by a low modulus, low conductivity YSZ or GSZ coating to fill between the columns. Low modulus and low conductivity being achieved by a combination of relatively low droplet and surface temperatures compared with the dense layer. After coating, the surface is ground smooth to remove the majority of the excess coating on the raised metallic features. The ceramic thickness on the metallic features after grinding is left at 8-12 mils to maximize spallation resistance or may be left thicker if an abradable layer of the filler composition and structure is desired.

The 8-12 mil HVOF bond coat layer may be used to naturally cover the radius corner on the pillars by means of the natural tendency of this high velocity process to round over edges. Alternatively, the rounded edges can be produced by machining, casting or additive methods.

Other details of the surface feature associated with geometrically segmented abradable ceramic (GSAC) thermal barrier coating (TBC) are set forth in the following detailed description and the accompanying drawings wherein like reference numerals depict like elements.

DETAILED DESCRIPTION

Figure 1:
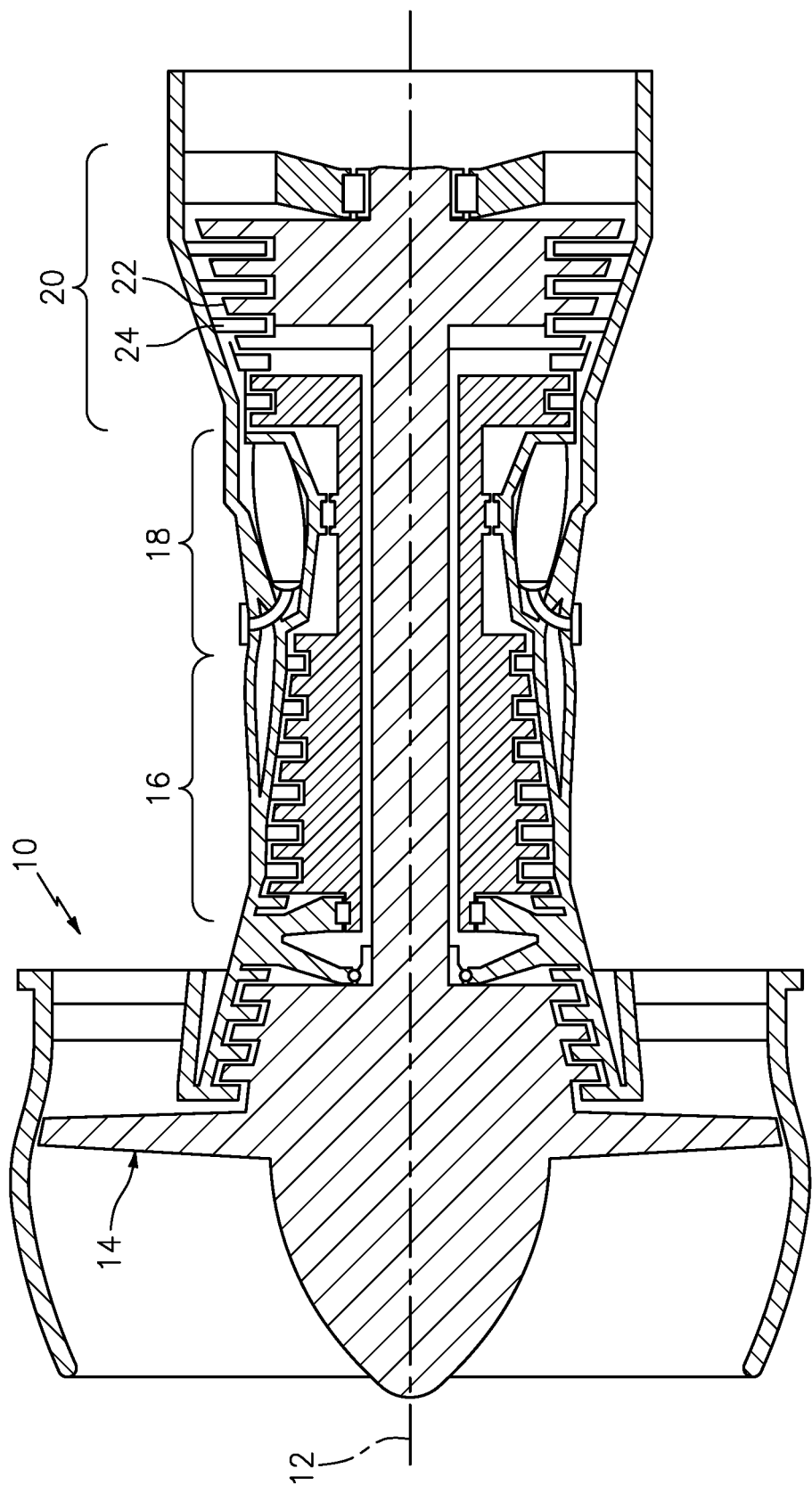
FIG. 1 is a schematic representation of an exemplary turbine engine.

Referring now to the FIG. 1 illustrates selected portions of an exemplary gas turbine engine 10, such as a gas turbine engine 10 used for propulsion. In this example, the gas turbine engine 10 is circumferentially disposed about an engine centerline 12. The engine 10 may include a fan 14, a compressor 16, a combustion section 18, and a turbine section 20 that includes rotating turbine blades 22 and static turbine vanes 24. It is to be understood that other types of engines may also benefit from the examples disclosed herein, such as engines that do not include a fan or engines having other types of compressors, combustors, and turbines.

Figure 2:
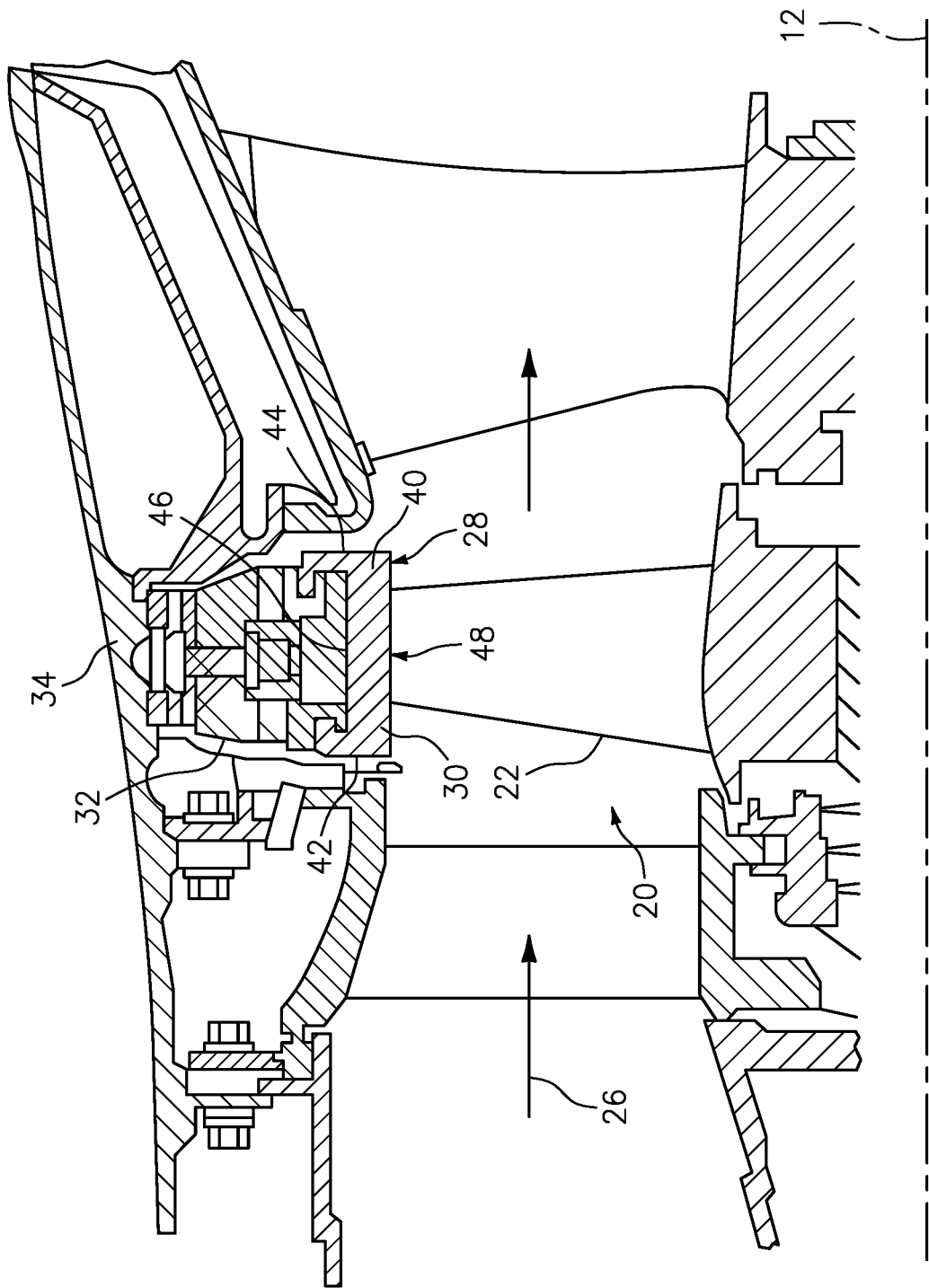
FIG. 2 is a turbine section of the turbine engine.

FIG. 2 illustrates selected portions of the turbine section 20. The turbine blades 22 receive a hot gas flow 26 from the combustion section 18 (FIG. 1). The turbine section 20 includes a blade outer air seal system 28, having a plurality of seal members 30, or gas turbine articles, that function as an outer wall for the hot gas flow 26 through the turbine section 20. Each seal member 30 is secured to a support 32, which is in turn secured to a case 34 that generally surrounds the turbine section 20. For example, a plurality of the seal members 30 may be arranged circumferentially about the turbine section 20. It is to be understood that the seal member 30 is only one example of an article in the gas turbine engine and that there may be other articles within the gas turbine engine that may benefit from the examples disclosed herein.

Figure 3:
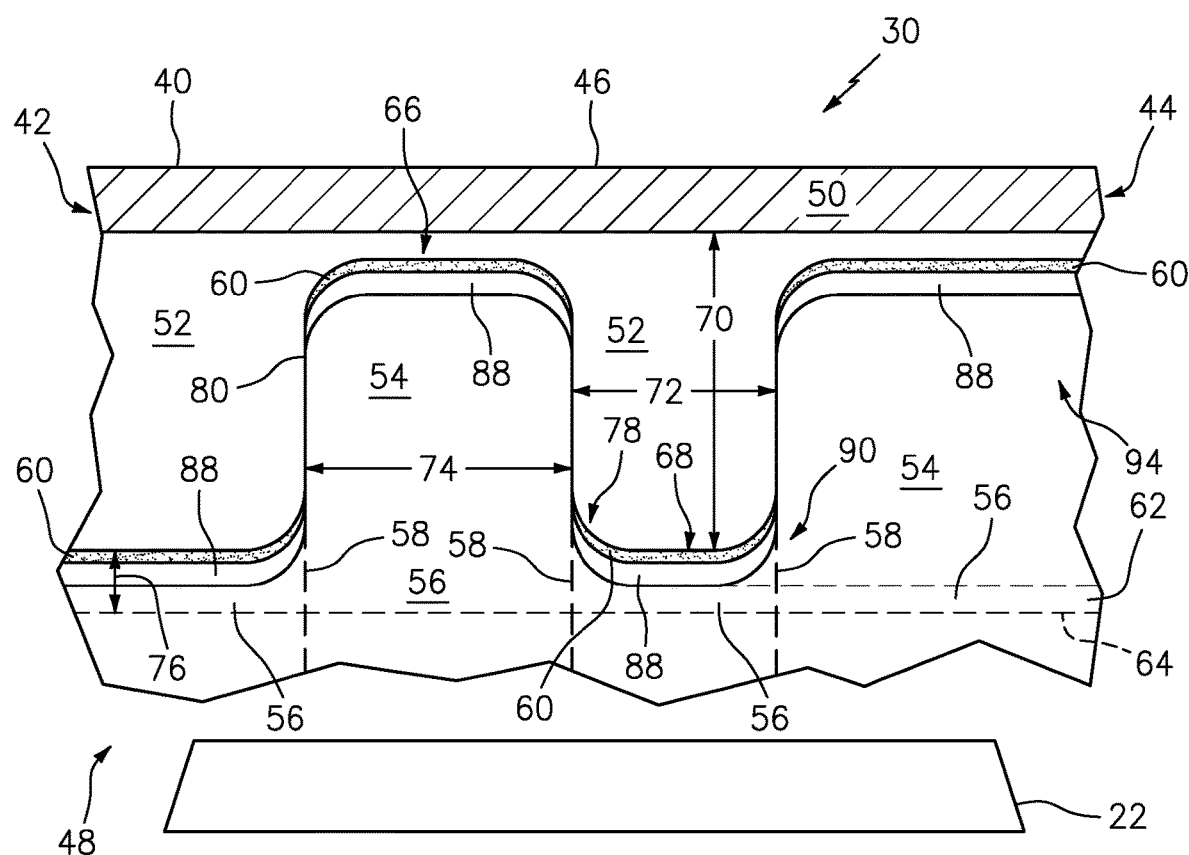
FIG. 3 is an exemplary portion of a turbine article.

FIG. 3. illustrates a portion of seal member 30 having two circumferential sides 40 (one shown), a leading edge 42, a trailing edge 44, a radially outer side 46, and a radially inner side 48 that is adjacent to the hot gas flow path 26 and blade 22. It should be noted that the view in FIG. 3 is a small section of a part cross section. Leading edge 42 and trailing edge 44 do not necessarily have to be leading and trailing edges of the part, but rather the forward and aft edges of the section shown. In an exemplary embodiment, they can represent actual leading and trailing edges. The term "radially" as used in this disclosure relates to the orientation of a particular side with reference to the engine centerline 12 of the gas turbine engine 10.

The seal member 30 includes a substrate 50, a plurality of geometric surface features 52 (hereafter "surface features")

that protrude from the substrate 50 on the gas path side of the seal member 30. A thermally insulating topcoat 54 (e.g., a thermal barrier, (TBC)) can be disposed over the plurality of surface features 52 and substrate 50. It is to be understood that the surface features 52 may not be shown to scale. Moreover, the substrate 50 may include known attachment features for mounting the seal member within the gas turbine engine 10.

The thermally insulating topcoat 54 includes segmented portions 56 that are separated by faults 58 extending through the thickness of the thermally insulating topcoat 54 from the plurality of surface features 52. The faults 58 extend from the edges or sides of the surface features 52 and facilitate reducing internal stresses within the thermally insulating topcoat 54 that may occur during manufacture or from sintering of the topcoat material at relatively high surface temperatures within the turbine section 20 during use in the gas turbine engine 10. Depending on the composition of the topcoat 54, surface temperatures of about 2500° F. (1370° C.) and higher may cause sintering. The sintering may result in partial melting, densification, and diffusional shrinkage of the thermally insulating topcoat 54 and thereby induce internal stresses. The faults 58 provide pre-existing locations for releasing energy associated with the internal stresses (e.g., reducing shear and radial stresses). That is, the energy associated with the internal stresses may be dissipated by the faults 58 such that there is less energy available for causing delamination cracking between the thermally insulating topcoat 54 and the underlying substrate 50 or bond coat 60 and spallation.

The faults 58 may be produced by using the surface features 52. That is, the pattern and pillar shape of the surface features 52 is not generally limited and may be a grid type of pattern with individual protrusions that extend from the surface of the substrate 50. In any case, the dimensions of each of the plurality of surface features 52 may be designed with a particular ratio of a height 70 of the surface feature 52 to a width 72 of the surface feature 52. For instance, the width 72 is selected such that the bond coat 60 (if used) and thermally insulating topcoat 54 can be built-up onto the tops or tips of the surface feature 52 during the deposition process. Likewise, the height 70 of surface features 52 is selected such that the portion of the thermally insulating topcoat 54 that builds-up on tops of the surface features 52 is discontinuous from other portions of the thermally insulating topcoat 54 that build-up in the valleys 66, or lower recess portion, between the surface features 52. As will be described with reference to an example fabrication method below, it is this discontinuity or disconnection between the portions of the thermally insulating topcoat 54 on the surface features 52 and between the surface features 52 that produces the fault 58 between the segmented portions 56. In comparison, narrow widths of the surface features in combination with short heights may lead to a continuous over-coating of the thermally insulating topcoat 54 rather than discontinuous portions on the tops of the surface features 52 and in the valleys 66.

A spacing 74 between the pluralities of surface features 52 may also be selected to facilitate reducing internal stresses of the thermally insulating topcoat 54. As an example, the spacing 74 between the surface features 52 may be selected with regard to the thickness of the thermally insulating topcoat 54, such as the thickness taken from the top of the surface features 52 or bond coat 60 to the radially inner side 48, as indicated by arrow 76. In some examples, a ratio of the spacing 74 between the surface features 52 to the thickness 76 of a thermally insulating topcoat 54 may be a function of the surface feature height 70 minus the top 68 radius minus a radius of the bottom 69 of the surface feature 52. The selected spacing 74 may be smaller than a spacing of cracks that would occur naturally, without the faults 58, which makes the thermally insulating topcoat 54 more resistant to spalling and delamination. Thus, different spacing 74 is appropriate for different thicknesses 76 of the thermally insulating topcoat 54.

The material selected for the substrate 50, bond coat 60 (if used), and thermally insulating topcoat 54 are not necessarily limited to any particular kind. For the seal member 30, the substrate 50 may be a metal alloy, such as a nickel based alloy. The bond coat 60 may include any suitable type of bonding material for attaching the thermally insulating topcoat 54 to the substrate 50. In some embodiments, the bond coat 60 includes a nickel alloy, platinum, gold, silver, or MCrAlY where the M includes at least one of nickel, cobalt, iron, or combination thereof, Cr is chromium, Al is aluminum and Y is yttrium. The bond coat 60 may be approximately 8-12 mills thick, but may be thicker or thinner depending, for example, on the type of material selected and requirements of a particular application.

The thermally insulating topcoat 54 may be any type of ceramic material suited for providing a desired heat resistance in the gas turbine article. As an example, the thermally insulating topcoat 54 may be an abradable coating, such as yttria stabilized zirconia, hafnia, and/or gadolinia, gadolinia zirconate, molybdate, alumina, or combinations thereof. The topcoats 54 may also include porosity. While various porosities may be selected, typical porosities in a seal application include 5 to 70% by volume. In an exemplary embodiment the topcoat 54 can include a 10-40 v % porosity. In another exemplary embodiment the topcoat 54 can have a porosity of 15 to 25 v %.

In the illustrated example, the thermally insulating topcoat 54 includes an abradable layer 62 that extends above the surface features 52. In use, the tips of turbine blades 22 may abrade a groove in the abradable layer 62 such that a post-rub layer 54 (separated by the dotted line parallel to the radially inner side 48) remains between the tips of the turbine blades 22 and the bond coat 60 or tops of the surface features 52. The post-rub layer 54 provides thermal protection of the underlying substrate 50 and surface features 52. In this regard, the thicknesses of the abradable layer 62 may be designed to meet the needs of a particular application. The abradable layer 62 can be machined level to produce a smooth flowpath surface 64.

Alternatively, the machining can leave portions near the valleys 66 that can be dimpled leaving less material between the surface features 52. In a further alternative embodiment the flowpath surface 64 can be machined to reduce a thicker application of the topcoat 54 resulting in thicker portions proximate the surface features or above the height of the surface features 52.

In an exemplary embodiment, the topcoat 54 can be ground at the surface 64 to remove the more porous insulating layer from the dense layer on the surface features 52. It is contemplated that the topcoat 54 can be fully or partially machined, or even ground partially into the dense layer 88 to a maximum of about ⅓ of the dense layer 88 thickness. If the topcoat 54 is ground too far in, the benefit of the rounded edges 86 can be lost, by leaving the rounded edges 86 covered by thicker dense ceramic. The intent is to have the dense layer 88 thickness taper to zero over the rounded edges 86. The dense layer 88 can taper to a lesser thickness at the edges 86. In an exemplary embodiment, the dense layer 88 can taper to <50% of the thickness at the center or generally flat top 68.

The faults 58 may be formed during fabrication of the thermally insulating topcoat 54. As an example, a thermal spray process may be used to deposit the thermally insulating topcoat 54 onto the substrate 50 and bond coat 60, if used. The bond coat 60 may be deposited onto portions of the surface features 52 prior to deposition of the thermally insulating topcoat 54. In this case, the deposition process may be a line-of-sight process such that the sides of the surface features include less bond coat 60 material or are free of any bond coat 60 material. That is, the bond coat 60 may be discontinuous over the surface of the substrate 50.

For instance, the thermal spray process may be controlled to deposit the thermally insulating topcoat 54 such that a portion of the thermally insulating topcoat 54 builds-up with a dense ceramic layer TBC 88 on the top 68 of the surface features 52 and in the recesses 66 between the surface features 52 with a dense TBC layer 88 with high toughness and greater CMAS resistance due to low porosity. The dense layer 88 can be from 5-10 mills thick and formed from dense YSZ APS coating. The dense layer 88 can be up to 30 mils, but most desirably 5-10 or 5-20 mils thick. It is contemplated that the concept of dense can be having less than 10% porosity. In an exemplary embodiment, the density can be a porosity of from 0-15%, and in another example the density can be 0-10% porosity, and even 0-5% porosity. The dense layer 88 on the top of the surface features 52 may be dense vertically microcracked (DVC). It is understood that it would be hard to produce that vertical microcracking in the valleys 66.

A low modulus, low conductivity YSZ or GSZ coating 54 can be used to fill between the surface features 52. The thermally insulating topcoat 54 can be built up in the valleys 66 between the surface features 52 discontinuously from the portion on top 68 of the surface features 52 (i.e., no bridging with the topcoat on the surface features 52). That is, the portion on the tops 68 of the surface features 52 is not connected to the portion between the surface features 52. As the build-up of material continues, however, the portion building-up in between the surface features 52 eventually builds up with porous TBC to the tops 68 of the surface features 52 such that the portions between the surface feature 52 is laterally adjacent to the portions on the surface features 52. Because of the discontinuity created by the height and width of the surface features 52, the continued build-up of the portions on top 68 of the surface features 52 and between the surface features 52 forms the faults 58 between the segmented portions 56.

The ceramic topcoat 54 can segment by cracking naturally between the pillar shaped surface features 52 resulting from the weak spot due to deposition and stress concentration location. Depending on the parameters of the deposition process, the faults 58 may be gaps between neighboring segmented portions 56 or discontinuities in microstructure between the neighboring portions. That is, the portions may be so close together that there is little or no gap therebetween except that there is a discontinuous plane or fault line between the segmented portions 56. The radially inner side 48 may thereby be uneven immediately after deposition of the thermally insulating topcoat 54 but may be machined to provide the relatively smooth surface 64 as shown.

In an exemplary embodiment, the topcoat 54 between the surface features 52 can be more porous and strain tolerant and can cover greater than 50 percent of a coating surface area 94 and the surface features 52 cover less than or equal to 50 percent of surface area 94. The topcoat 54 between the surface features 52 has limited width due to segmentation by the metallic surface feature 52 geometry and acts as columns which can dissipate stresses over significant height. The relatively thin dense topcoat portions 88 are configured to be spall resistant and have a cooler surface. CMAS infiltration can be limited at segmentation locations 58 due to cooling effect along the sides of the metallic surface features 52. The tops 68 of the surface features 52 have relatively rounded column edges 78 configured to reduce stress concentrations at edges 80 of the thermally insulating topcoat 54.

After partial spallation of the topcoat 54, the topcoat 54 will remain in recesses 66 to reduce heat flux. The exemplary metallic surface feature 52 geometry is also configured to relieve local stress in the metal and has a cooler surface than a spalled region on a flat substrate. This configuration not only reduces oxidation rate of the exposed metallic due to the lower temperature relative to a generally flat surface, but also reduces propensity for thermal mechanical fatigue cracking by breaking up long range stresses by providing the relatively smaller exposed column top 68. The value of reducing the stress in the metallic surface is evident when one considers that TMF cracks tend to initiate at the transition from spalled to non-spalled TBC on partially spalled flat surfaces.

Figure 4:
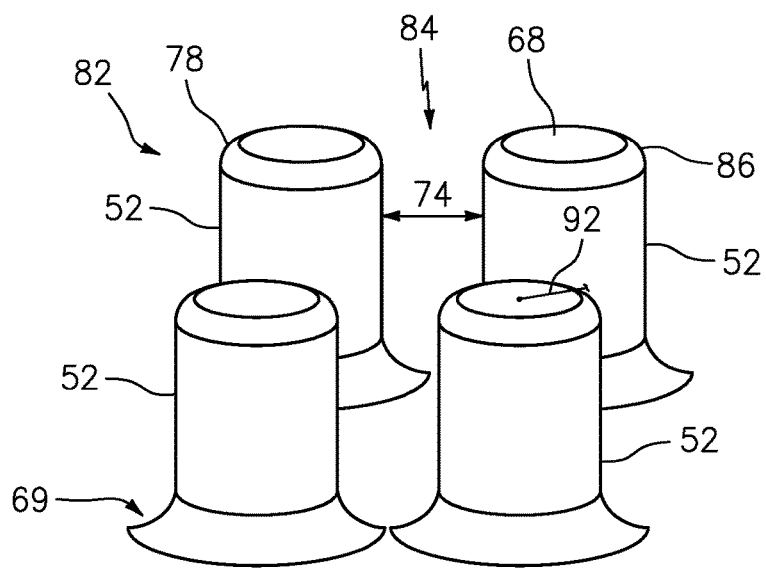
FIG. 4 illustrates exemplary geometric surface features of the turbine article.

Referring also to FIG. 4, the plurality of surface features 52 may initially be a separate, metal alloy piece that is then attached to the substrate 50, such as in a brazing process. Alternatively, the surface features 52 may be formed with the substrate 50 as a single, unitary piece, e.g., cast, additive manufacturing; and the like. The surface features 52 can be formed by casting into the base metal, forming by additive manufacturing or machining the surface features 52 in the surface of the base metal or as a layer of MCrAlY. In any case, the surface features 52 may be selected to be any of a variety of different patterns 82 of rounded metallic column/pillar shapes. As an example, the surface features 52 may be formed as a pattern of rounded columns that define a cell structure 84 therebetween. The patterns 82 can provide the metallic column surface feature 52 spacing that is less than or equal to fifty percent of the area being metallic. The surface features 52 can be configured separated to reduce the stress transmission through the metal. In an exemplary embodiment, the surface features 52 can optionally be formed made of MCrAlY with a base layer beneath made of MCrAlY.

The surface feature 52 forming process is selected to produce pillars with rounded edges 86 proximate the tops 68. The rounded edges 86 at the top 68 of the metallic column/pillar surface feature 52 is necessary for producing the necessary stress relief. Rounded bottoms 69 may be incorporated to facilitate manufacturing or reduce stress concentration where surface features 52 are joined with substrate 50. The rounded bottoms 69 can include a bottom radius of 0.1 to 1 times the column width 72. In an exemplary embodiment, the surface features 52 can have an aspect ratio of 0.5-2.5 height to width the surface feature 52 height/depth. The top 68 of the surface feature 52 can include a radius 92 from 1 to 2 times the thickness of the topcoat thickness 54. In another exemplary embodiment, the radius, width and height criteria of the surface feature 52 can include a 1× dense layer 88 thickness<=a radius 92<=5× dense layer 88 thickness. In another exemplary embodiment, 12× radius 92>=surface feature width 72>=4× radius 92. In another exemplary embodiment, the 1× dense layer 88 thickness<=surface feature height 70<=5× dense layer 88 thickness and the surface feature height 70>=2× the radius 92. The criteria can include a 1× dense layer 88 thickness<=surface feature spacing 74<=5× dense layer 88 thickness. It can be noted that the radius 92 that is relevant can include the uppermost metallic interface of the surface feature 52, so if there is a bond coat 60 present, the top of the bond coat 60 would be counted for the radius 92 dimension.

In another exemplary embodiment, the process can form rounded edges 86 to any degree or combination as necessary to produce the coating segmentation structure 56. The rounded metallic column edges 86 are configured to reduce stress concentrations at edges 90 of the dense layer of TBC 88.

Varying surface feature diameter will help to maintain design criteria for the desired ratios of coating thickness to surface feature diameter, depth and pillar spacing.

A technical advantage of the disclosed surface feature associated with geometrically segmented abradable ceramic (GSAC) thermal barrier coating (TBC) includes a TBC coating with high insulating factor.

Another technical advantage of the disclosed surface feature associated with geometrically segmented abradable ceramic (GSAC) thermal barrier coating (TBC) includes a thin ceramic portion that is naturally more erosion, CMAS and spallation resistant and has a cooler surface.

Another technical advantage of the disclosed surface feature associated with geometrically segmented abradable ceramic (GSAC) thermal barrier coating (TBC) includes a topcoat that is resistant to stresses associated with sintering and to CMAS.

Another technical advantage of the disclosed surface feature associated with geometrically segmented abradable ceramic (GSAC) thermal barrier coating (TBC) includes a topcoat that retains some insulation benefit even with partial spallation.

Another technical advantage of the disclosed surface feature associated with geometrically segmented abradable ceramic (GSAC) thermal barrier coating (TBC) includes a coating system that does not cause gradients in the metallic substrate that will induce TMF cracking in the event of partial spallation.

Another technical advantage of the disclosed surface feature associated with geometrically segmented abradable ceramic (GSAC) thermal barrier coating (TBC) includes the rounded metallic column edges reduce stress concentration at the edges of dense TBC.

Another technical advantage of the disclosed surface feature associated with geometrically segmented abradable ceramic (GSAC) thermal barrier coating (TBC) includes the thick ceramic portions having limited width due to segmentation by the metallic geometry and acts as columns which can dissipate stress over a significant height.

Another technical advantage of the disclosed surface feature associated with geometrically segmented abradable ceramic (GSAC) thermal barrier coating (TBC) includes any CMAS infiltration is limited at segmentation locations due to cooling effect along the sides of the metallic columns.

Another technical advantage of the disclosed surface feature associated with geometrically segmented abradable ceramic (GSAC) thermal barrier coating (TBC) includes the metallic column geometry relieves local stress and has a cooler surface than a spalled region on a flat substrate.

Another technical advantage of the disclosed surface feature associated with geometrically segmented abradable ceramic (GSAC) thermal barrier coating (TBC) includes after partial spallation, the ceramic topcoat will remain in the recesses to reduce heat flux.

Another technical advantage of the disclosed surface feature associated with geometrically segmented abradable ceramic (GSAC) thermal barrier coating (TBC) includes a reduction in the rate of blade tip to seal clearance growth and EGT margin loss.

Another technical advantage of the disclosed surface feature associated with geometrically segmented abradable ceramic (GSAC) thermal barrier coating (TBC) includes an improvement in the repairability of the coating due to less TMF cracking.

There has been provided a surface geometry associated with geometrically segmented abradable ceramic (GSAC) thermal barrier coating (TBC). While the surface feature associated with geometrically segmented abradable ceramic (GSAC) thermal barrier coating (TBC) has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A thermal barrier coating disposed on a substrate comprising:
   a plurality of surface features formed on said substrate proximate an inner side of said substrate, each of said plurality of surface features comprising a metallic column having a top with rounded edges;
   a dense ceramic layer disposed in a valley located between each of said plurality of surface features, and said dense ceramic layer disposed on said tops and covering said rounded edges; the dense ceramic layer thickness tapers to zero over the rounded edges;
   a thermally insulating topcoat disposed over the plurality of surface features; and
   a bond coat disposed between the dense ceramic layer and the substrate.

2. The thermal barrier coating according to claim 1, wherein said dense ceramic layer comprises a 5-10 mil thick YSZ coating.

3. The thermal barrier coating according to claim 1, wherein said bond coat comprises a thickness of from 1-15 mil of MCrAlY.

4. The thermal barrier coating according to claim 1, wherein said thermally insulating topcoat comprises
   a porous material disposed over the dense ceramic layer between said plurality of surface features, and/or
   disposed over the dense ceramic layer at the top of the metallic columns.

5. The thermal barrier coating according to claim 4, wherein said thermally insulating topcoat covers greater than 50 percent of a total area of the thermal barrier coating.

6. The thermal barrier coating according to claim 1, further comprising:
   the insulating topcoat includes an abradable layer that extends above the plurality of surface features.

7. The thermal barrier coating according to claim 1, wherein the dense ceramic layer disposed on said tops of the plurality of surface features is configured as dense vertically microcracked.

8. A gas turbine engine comprising:
   a compressor section;
   a combustor fluidly connected with the compressor section; and
   a turbine section downstream from the combustor, the turbine section having a seal that includes a substrate extending between two circumferential sides, a leading edge, a trailing edge, an inner side for resisting hot engine exhaust gases from the combustor, and an outer side, a plurality of surface features formed in said substrate protruding from said substrate away from said outer side, said plurality of surface features each comprising a metallic column having a rounded edge proximate a column top, a dense layer disposed in a valley between said plurality of surface features and disposed on said tops of said metallic columns, the dense ceramic layer thickness tapers to zero over the rounded edge; a thermally insulating topcoat disposed over the plurality of surface features and disposed over the dense layer; and a bond coat disposed between the dense layer and the substrate.

9. The gas turbine engine according to claim 8, wherein the plurality of surface features are configured as a pattern of rounded columns that define a cell structure therebetween; wherein the pattern provides the metallic columns a spacing that results in the plurality of surface features making up less than or equal to fifty percent of a coating area.

10. The gas turbine engine according to claim 9, wherein said plurality of surface features each comprise rounded edges at both the top and a bottom of the metallic column configured to reduce stress in the dense layer at both the tops and the bottoms of the metallic column of said plurality of surface features.

11. The gas turbine engine according to claim 8, wherein said thermally insulating topcoat comprises a porous material disposed over the dense layer between said plurality of surface features and disposed over the dense layer at the tops of the metallic columns.

12. The gas turbine engine according to claim 8, wherein said plurality of surface features include an aspect ratio of 0.5-2.5 height to width.

13. A process of interrupting spallation for geometrically segmented coatings on a gas turbine engine component comprising:

said gas turbine engine component having a surface;

forming a plurality of surface features protruding from said surface, said plurality of surface features each comprising a metallic column having a rounded edge proximate a column top;

disposing a dense ceramic layer on said surface in a valley between said plurality of surface features and disposing said dense ceramic layer on said rounded edges and said tops of said metallic column, the dense ceramic layer thickness tapers to zero over the rounded edge; and disposing a thermally insulating topcoat over said plurality of surface features; and disposing a bond coat layer between the surface and said dense ceramic layer.

14. The process of claim 13, further comprising:

configuring said plurality of surface features as a pattern of rounded columns that define a cell structure therebetween; wherein the pattern provides the metallic columns a spacing that results in the plurality of surface features making up less than or equal to fifty percent of a coating area.

15. The process of claim 13, wherein said plurality of surface features include an aspect ratio of 0.5-2.5 height to width.

16. The process of claim 13, further comprising:

reducing stress in the dense ceramic layer at both the tops and a bottoms of the metallic columns of each of said plurality of surface features.

17. The process of claim 13, wherein said thermally insulating topcoat comprises a porous material disposed over the dense ceramic layer between said plurality of surface features, and/or disposed over the dense ceramic layer at the tops of the metallic columns.

\* \* \* \* \*